United States Patent
Francoeur et al.

(10) Patent No.: US 7,136,396 B2
(45) Date of Patent: Nov. 14, 2006

(54) METHOD AND APPARATUS FOR COMPILING A PROTOCOL DATA UNIT

(75) Inventors: William Francoeur, Royersford, PA (US); Harry Seth Smith, Malvern, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 163 days.

(21) Appl. No.: 10/994,502

(22) Filed: Nov. 22, 2004

(65) Prior Publication Data

US 2005/0135426 A1 Jun. 23, 2005

Related U.S. Application Data

(60) Provisional application No. 60/524,509, filed on Nov. 24, 2003.

(51) Int. Cl.
H04J 3/24 (2006.01)
(52) U.S. Cl. ........................ 370/473; 370/474
(58) Field of Classification Search .................. None
See application file for complete search history.

(56) References Cited

U.S. PATENT DOCUMENTS

| | | | |
|---|---|---|---|
| 5,414,702 A * | 5/1995 | Kudoh | 370/395.7 |
| 5,774,467 A | 6/1998 | Herrera Van Der Nood et al. | |
| 5,930,265 A * | 7/1999 | Duault et al. | 370/473 |
| 6,603,739 B1 * | 8/2003 | Dubuc | 370/232 |
| 6,904,016 B1 * | 6/2005 | Kuo et al. | 370/235 |
| 2002/0001314 A1 * | 1/2002 | Yi et al. | 370/469 |
| 2002/0048281 A1 * | 4/2002 | Yi et al. | 370/474 |
| 2003/0007480 A1 * | 1/2003 | Kim et al. | 370/349 |
| 2003/0099305 A1 * | 5/2003 | Yi et al. | 375/295 |
| 2003/0147371 A1 * | 8/2003 | Choi et al. | 370/341 |
| 2003/0157927 A1 * | 8/2003 | Yi et al. | 455/411 |
| 2003/0185193 A1 * | 10/2003 | Choi et al. | 370/348 |
| 2003/0202501 A1 * | 10/2003 | Jang | 370/346 |
| 2003/0235212 A1 * | 12/2003 | Kuo | 370/503 |
| 2004/0114616 A1 | 6/2004 | Wang | |

* cited by examiner

Primary Examiner—Wellington Chin
Assistant Examiner—Phuongchau Ba Nguyen
(74) Attorney, Agent, or Firm—Volpe and Koenig, P.C.

(57) ABSTRACT

A method and apparatus for compiling a protocol data unit (PDU) having a predetermined length from at least one data block for transmission in a wireless communication system. At least one data block is designated for transmission. The data block is first stored in a memory. A data block information list and a data block address list are generated for the data block. The data block information list contains the length of the data block which is to be included within the PDU and the data block address list contains the memory address of data block which is to be included in the PDU. The PDU is then compiled utilizing the data block information list and the data block address list when the PDU is ready for transmission.

12 Claims, 4 Drawing Sheets

| SEQUENCE NUMBER | E | Oct1 | |
|---|---|---|---|
| LENGTH INDICATOR | E | | (Optional) (1) |
| ⋮ | | | |
| LENGTH INDICATOR | E | | (Optional) |
| DATA | | | |
| PAD | | Last Octet | (Optional) |

*FIG. 2a*
PRIOR ART

| D/C | SEQUENCE NUMBER | | | Oct1 | |
|---|---|---|---|---|---|
| SEQUENCE NUMBER | | P | HE | Oct2 | |
| LENGTH INDICATOR | | | E | Oct3 | (Optional) (1) |
| ⋮ | | | | | |
| LENGTH INDICATOR | | | E | | |
| DATA | | | | | |
| PAD OR A PIGGYBACK STATUS PDU | | | | OctN | |

*FIG. 2b*
PRIOR ART

METHOD AND APPARATUS FOR COMPILING A PROTOCOL DATA UNIT

CROSS REFERENCE TO RELATED APPLICATION

This application claims the benefit of U.S. Provisional Application No. 60/524,509 filed Nov. 24, 2003, which is incorporated by reference as if fully set forth.

FIELD OF INVENTION

The present invention is related to a wireless communication system. More particularly, the present invention is a method and apparatus for compiling a protocol data unit (PDU) having a predetermined format and length from a plurality of data blocks in a wireless communication system.

BACKGROUND

A typical Universal Mobile Telecommunication System (UMTS) in accordance with current Third Generation Partnership Project (3GPP) specifications is depicted in FIG. 1. The UMTS includes a Core Network (CN) interconnected with a UMTS Terrestrial Radio Access Network (UTRAN) via an Iu interface. The UTRAN is configured to provide wireless communication services to users having wireless transmit receive units (WTRUs) via a Uu interface. The UTRAN has one or more Radio Network Controllers (RNCs) and Node-Bs, which collectively service the geographic coverage of the wireless communication system for WTRUs.

One or more Node-Bs are connected to an RNC via an Iub interface. The UTRAN may have several groups of Node-Bs connected to different RNCs. Where more than one RNC is provided in a UTRAN, inter-RNC communication is performed via an Iur interface.

In a 3GPP communication system, multiple shared and dedicated channels of variable data rates are combined for transmission. Transport Channels (TrCHs) are used for transfer of user data and signaling between WTRUs and a Node-B or other devices within the communication network. TrCHs are a composite of one or more physical channels defined by mutually exclusive physical resources. TrCH data is transferred in sequential groups of Transport Blocks (TBs) defined as Transport Block Sets (TBSs). Each TBS is transmitted in a given Transmission Time Interval (TTI). For each TrCH, a Transport Format Set (TFS) is specified. Each Transport Format (TF) defines a TBS comprising a specified number of TBs, where each TB preferably has the same size within a given TBS.

The Radio Link Control (RLC) function generates octet-aligned PDUs (i.e., 8 bit quantities). Thus, the RLC PDUs are defined as groups of selected number of octets, such that the RLC PDU bit size is always evenly divided by eight. All data transferred by specific TrCHs must fit into the TB sizes specified for the TFS of a particular TrCH. However, variable size data blocks exist that cannot be predicted for Random Access Network (RAN) and CN signaling data as well as Non-Real Time (NRT) user data transmissions.

In order to allow for the transfer of variable size data blocks, the RLC provides a segmentation and reassembly function and a padding function. The segmentation and reassembly function reduces the size of data blocks and is used when a data block is larger than the maximum allowed TB size. The padding function increases the data block or segmented data block size by padding it with extra bits to fit a specified TB size.

Each RLC PDU can contain one or more unrelated data blocks, or a portion of a data block. The final internal composition of the RLC PDU is not determined until transmission of the RLC PDU is requested. Therefore, it is inefficient to build part of the RLC PDU and have to rebuild it later, when additional data blocks are added to the RLC PDU.

FIGS. 2(a) and 2(b) illustrate RLC PDUs for transmitting data blocks under current 3GPP specifications for an unacknowledged mode (UM) and on acknowledged mode (AM), respectively. At the front of the PDU are a series of length indicators (LIs). The LIs indicate the last octet of data blocks ending within the PDU. Following all the LIs are blocks of data to be transmitted.

Information relating to each separate block of data is conveyed along with, but separated from, the data blocks which are grouped together in the PDU. Data blocks are sequentially assembled as they become designated for a particular transmission unit. Conventionally, each data block of the PDU is written into a memory individually as it became designated for inclusion in a PDU.

Prior art systems need a significant amount of time for rearranging the data blocks within the formatted PDU. In order to add another data block and its corresponding LI, the previous data block must be moved over by one or two bytes in order to add a new LI after the previous one. As each data block is added, the amount of data that needs to be shifted to accommodate new LIs gets larger and larger. This incurs a tremendous number of processing cycles and, therefore, time.

Accordingly, it is desirable to provide a more efficient processing method and apparatus for assembling unrelated data blocks into a PDU for transmission.

SUMMARY

The present invention is related to a method and apparatus for compiling a PDU having a predetermined length from at least one data block for transmission in a wireless communication system. At least one data block is designated to be included in a PDU for transmission. The data block is first stored in a memory. A data block information list and a data block address list are generated for each PDU. The data block information list contains the length of the data block which ends within the PDU, and the data block address list contains the memory address of the data block or a portion of the data block which is included in the PDU. The PDU is compiled utilizing the data block information list and the data block address list when the PDU is ready for transmission.

BRIEF DESCRIPTION OF THE DRAWINGS

A more detailed understanding of the invention may be had from the following description of a preferred example, given by way of example and to be understood in conjunction with the accompanying drawing wherein:

FIGS. 2(a) and 2(b) are prior art block diagrams of RLC PDUs;

DETAILED DESCRIPTION OF THE PREFERRED EMBODIMENTS

Figure 1:
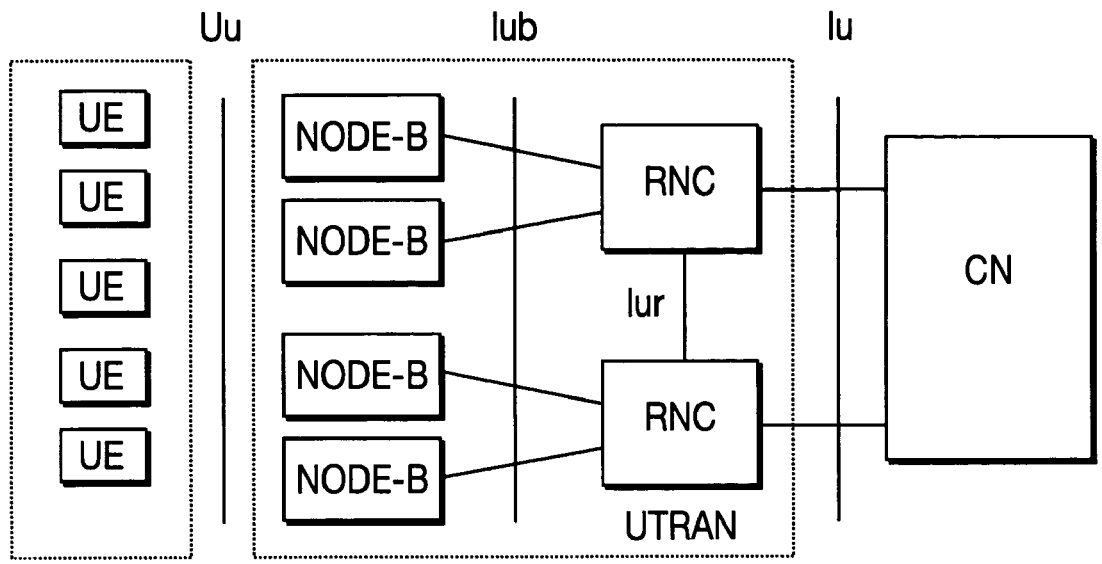
FIG. 1 is a block diagram of a prior art wireless communication system.

The present invention is described with reference to the drawing figures wherein like numerals represent like elements throughout.

The present invention can be implemented in either WTRUs or Node-Bs. The features of the present invention may be incorporated into an integrated circuit (IC) or be configured in a circuit comprising a multitude of interconnecting components.

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

Figure 3:
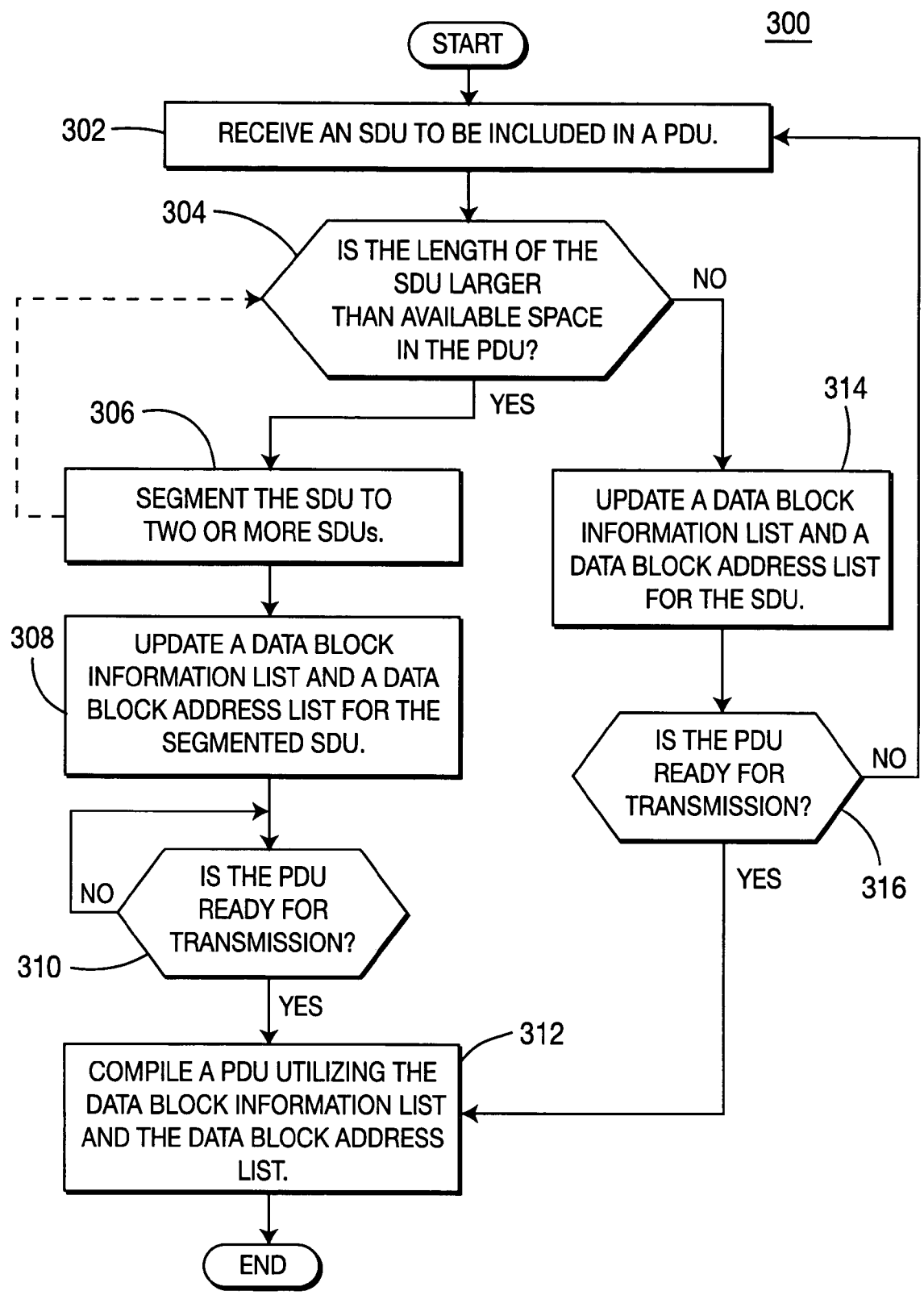
FIG. 3 is a flow diagram of a method for compiling a PDU in accordance with the present invention.

FIG. 3 is a flow diagram of a process 300 for compiling a PDU in accordance with the present invention. A plurality of data blocks, which will be hereinafter referred to as service data units (SDUs), are sequentially designated to be included in one or more RLC PDUs for transmission (step 302). SDUs are initially stored in a memory at a particular memory address and are retrieved from the memory when compiling a PDU for transmission. The process 300 then determines whether the length of an SDU is larger than currently available space in the PDU (step 304).

If the length of the SDU is larger than the available space in the current PDU, the SDU is segmented into two or more pieces and two or more PDUs are generated to transport the SDU (step 306). After the SDU is segmented, only the first portion of the segmented SDU is included in the current PDU for transmission, and the remaining pieces of the SDU are included in following PDUs, and processed in the same manner as indicated by the dotted line, and as will be explained in detail hereinafter.

A PDU descriptor is then generated for each PDU (step 308). The PDU descriptor includes information regarding the SDUs, (or the portion of an SDU), to be included within the PDU. The PDU descriptor is based upon information from the data block information list and the data block address list. In the present example, since the SDU is segmented, the data block information list includes the length of the portion of the segmented SDU included in the PDU. The data block address list includes the memory address of the SDU, (or in this case, the portion of the SDU) in the memory.

The process 300 then determines whether the PDU is ready for transmission (step 310). A PDU is ready for transmission when the PDU descriptor is populated with data and the PDU's transmission is being requested, such as by a Medium Access Control (MAC) layer. If the PDU is not ready for transmission, the process 300 waits for the request for transmission of the PDU. If the PDU is ready for transmission, the process 300 compiles the PDU utilizing the PDU descriptor (step 312).

The contents of the data block information list are sequentially inserted in the PDU as length indicators (LIs), and the SDUs to be included in the PDU are retrieved from the memory at the address stored in the data block address list.

If it is determined at step 304 that the length of the SDU is not larger than the available space, the entire SDU is included in the PDU. The PDU descriptor, (i.e. the data block information list and the data block address list), is then updated (step 314). Therefore, the length of the SDU is entered into the data block information list and the memory address where the SDU is stored is entered into the data block address list. It is then determined whether the PDU is ready for transmission (step 316). If the PDU is ready for transmission, the process 300 proceeds to step 312 to compile the PDU utilizing the PDU descriptor. If the PDU is not ready for transmission, the process 300 returns to step 302 in order to receive subsequent SDU.

In accordance with the present invention, a final PDU for transmission is not compiled until the PDU is ready for transmission. When the PDU is ready for transmission, a final and complete version of the PDU is determined by utilizing the PDU descriptor, and the PDU is compiled in a single memory copy. The process 300 in accordance with the present invention avoids repeated copying of data, which requires more memory and execution cycles and reduces overall performance.

Figure 4A:
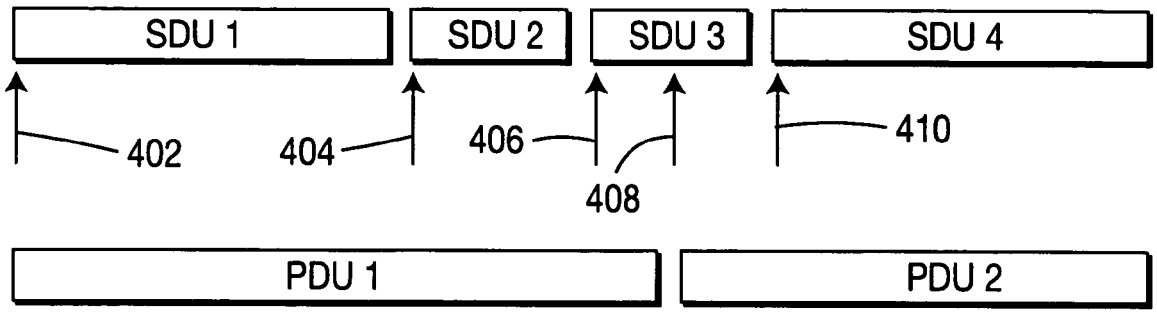
FIG. 4(a) illustrates a PDU being compiled in accordance with the method of the present invention.
Figure 4B:
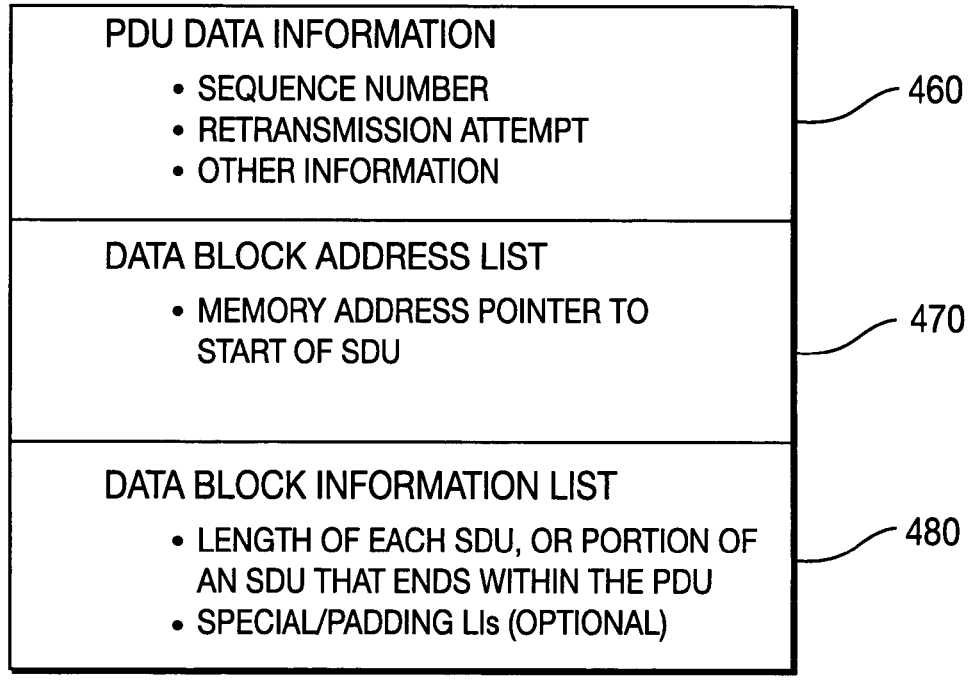
FIG. 4(b) is an example of a PDU descriptor in accordance with the present invention.

FIGS. 4(a) and 4(b) illustrate a PDU being compiled in accordance with the method of present invention utilizing a PDU descriptor 450. In the example of FIG. 4(a), four (4) SDUs, (i.e., SDU1, SDU2, SDU3, and SDU4), are received and queued for transport. The length of each SDU is consecutively compared with the available space of a PDU. Since the length of SDU1 is less than PDU1, SDU1 is included in PDU1 in its entity. Likewise, SDU2 is also included in PDU1 in its entity since the remaining space of PDU1 is still large enough to include SDU2. However, since the remaining space of PDU1 is not large enough to include SDU3, SDU3 is segmented and only a first portion of SDU3 is included in PDU1. The latter portion of SDU3 and SDU4 are included in PDU2.

A PDU descriptor 450 (as shown in FIG. 4(b)) maps SDUs, or portions of the SDUs, to each PDU. The PDU descriptor 450 may contain "general" PDU data information 460, a data block address list 470, and a data block information list 480. The PDU data information 460, (which is optional), may include information typically associated with prior art PDUs, including a sequence number of the PDU, retransmission attempts, or any other information. The data block address list 470 contains memory addresses, or pointers, to the start of each SDU in the memory. The data block information list 480 contains the length, (or an LI), for each SDU within the PDU, and optionally special/padding LIs. It should be noted that other information may be included with the PDU data information 460, the data block address list 470 and the data block information list 480, in addition to the information specifically shown in FIG. 4(b) without departing from the spirit and scope of the present invention.

In the foregoing example in FIG. 4(a), the PDU descriptor for PDU1 contains information about SDU1, SDU2, and the first portion of SDU3 that is transmitted within the PDU1. The memory addresses (or pointers), indicating the start of SDU1, SDU2 and SDU3 are illustrated as arrows 402, 404 and 406. The PDU descriptor for PDU2 contains information about the latter portion of SDU3 and SDU4. The memory addresses, (or pointers), indicating the start of the latter portion of SDU3 and SDU4 are illustrated as arrows 408 and 410, respectively.

Information regarding SDUs and the addresses of the SDUs in a memory is consecutively added to the PDU descriptor. If any SDU is later deemed unworthy of transmission, then the SDU is removed, and the PDU descriptor is updated accordingly. As PDUs are ready to transmit, a final version of the PDU is compiled using the references to the SDUs.

Figure 5:
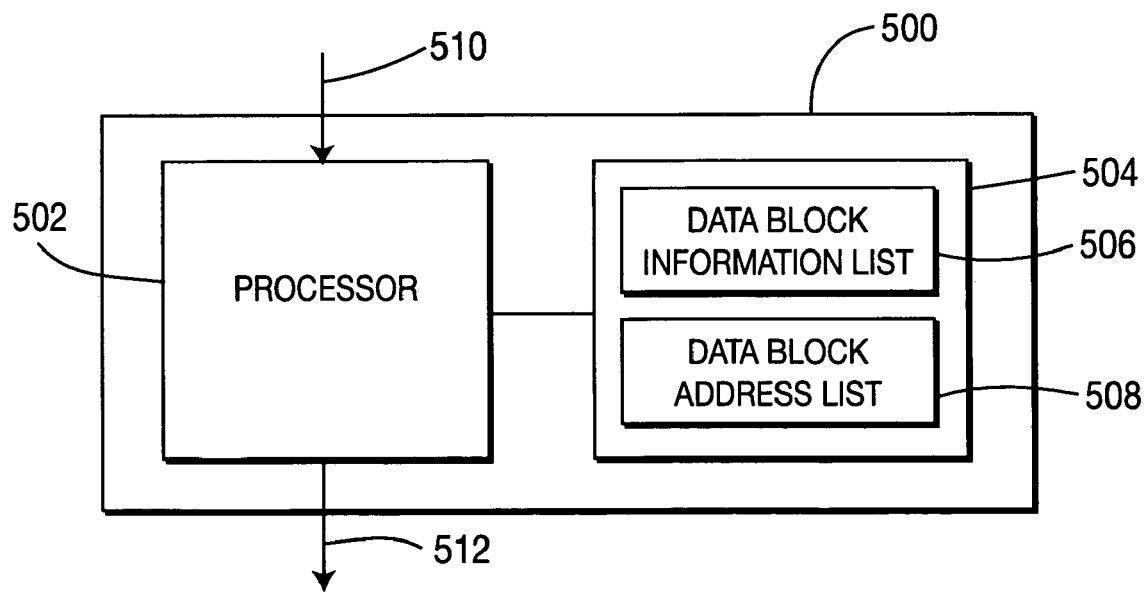
FIG. 5 is a block diagram of an apparatus for compiling a PDU in accordance with the present invention.

FIG. 5 is a block diagram of an apparatus 500 for compiling a PDU in accordance with the present invention. The apparatus 500 comprises a processor 502 and a memory 504. The processor 502 receives SDUs designated for transmission via an input port 510. The SDUs are stored in the memory 504. The memory 504 also stores information for the data block information list 506 and the data block address list 508. It should be noted that these two lists, 506 and 508, may be part of a single integrated list, instead of two separate lists. The information in the two lists, 506 and 508, along with general PDU data information (not shown) comprise a PDU descriptor, which contains all information about the SDUs to be included in the PDU.

The processor 502 calculates the length of each SDU or portion of an SDU which is within the PDU and stores the length, (or an LI), in the data block information list 506. The address of, (or pointer to), each SDU in the memory 504 is stored in the data block address list 508.

The processor 502 receives signals indicating that a transmission of the PDU is ready. The processor 502 then compiles a PDU, such as shown in FIG. 2 (a) or 2b, utilizing the information from the data block information list 506 and the data block address list 508. The processor 502 inserts LIs from the data block information list 506 into the PDU, and retrieves and attaches the corresponding SDUs using the address information stored in the data block address list 508.

In accordance with the present invention, the processor 502 does not generate intermediate versions of a PDU each time SDUs are designated for transmission. Rather, the processor 502 generates the PDU when the PDU is ready for transmission using a single memory copy. With this scheme, the processor 502 may avoid most, if not all, repeated copying of data, which requires more memory and execution cycles and reduces overall performance.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for compiling a protocol data unit (PDU) having a predetermined length from at least one service data unit (SDU) for transmission in a wireless communication system, the method comprising:
   receiving an SDU for transmission;
   storing the SDU in a memory;
   generating a data block information list, the data block information list containing the length of the SDU;
   generating a data block address list for the SDU, the data block address list containing the address of the SDU in the memory; and
   compiling the PDU utilizing the data block information list and the data block address list.

2. The method of claim 1 further comprising:
   segmenting the SDU if the length of the data block is larger than the predetermined length of the PDU.

3. The method of claim 1 wherein a plurality of SDUs are designated consecutively, and the data block information list and the data block address list are updated each time an SDU is designated for transmission.

4. The method of claim 1 wherein the PDU is compiled when the PDU is ready for transmission.

5. An apparatus for compiling a protocol data unit (PDU), having a predetermined length, from at least one service data unit (SDU) which is received in preparation for transmission, the apparatus comprising:
   a memory for storing a received SDU;
   a data block information list within the memory for storing the length of the received SDU in memory;
   a data block address list within the memory for storing the address of the received SDU;
   a processor for compiling a PDU from at least one storage SDU utilizing the information in the data block information list and the data block address list.

6. The apparatus of claim 5 wherein the processor segments the SDU when the length of the SDU is larger than the predetermined length of in the PDU.

7. The apparatus of claim 5 wherein the processor compiles the PDU when the PDU is ready for transmission.

8. The apparatus of claim 5 wherein the processor receives a plurality of SDUs consecutively and updates the data block information list and the data block address list each time an SDU is designated for transmission.

9. A method for compiling a protocol data unit (PDU) having a predetermined length from at least one service data unit (SDU) for transmission in a wireless communication system, the method comprising:
   receiving an SDU for transmission;
   storing the SDU in a memory;
   generating a PDU descriptor which includes the length of the PDU and the address of the SDU, and storing the descriptor within the memory; and
   compiling the PDU utilizing the PDU descriptor when the PDU is ready for transmission.

10. The method of claim 9 further comprising:
    segmenting the SDU if the length of the SDU is larger than the predetermined length of the PDU.

11. The method of claim 9 wherein a plurality of SDUs are designated consecutively, and the SDU descriptor is updated each time an SDU is designated for transmission.

12. The method of claim 11 wherein the PDU is compiled when the PDU is ready for transmission.

* * * * *

UNITED STATES PATENT AND TRADEMARK OFFICE
CERTIFICATE OF CORRECTION

| | | |
|---|---|---|
| PATENT NO. | : 7,136,396 B2 | |
| APPLICATION NO. | : 10/994502 | |
| DATED | : November 14, 2006 | |
| INVENTOR(S) | : Francoeur et al. | |

It is certified that error appears in the above-identified patent and that said Letters Patent is hereby corrected as shown below:

At column 5, line 24, before the word "utilizing", delete "2b" and insert therefor --(2b)--.

At claim 6, column 6, line 27, after the words "length of", delete "in".

Signed and Sealed this

Twenty-second Day of May, 2007

JON W. DUDAS
*Director of the United States Patent and Trademark Office*